Figure 1:
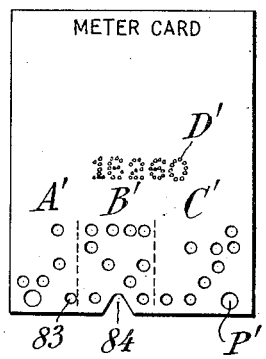

J. R. PEIRCE.
RECORDING APPARATUS.
APPLICATION FILED JULY 2, 1908.

1,110,643.

Patented Sept. 15, 1914.
10 SHEETS—SHEET 1.

WITNESSES:

INVENTOR:
John Hoyden Peirce,
By Attorneys

J. R. PEIRCE.
RECORDING APPARATUS.
APPLICATION FILED JULY 2, 1908.

1,110,643.

Patented Sept. 15, 1914.
10 SHEETS—SHEET 2.

INVENTOR
John Royden Peirce,
By Attorneys

WITNESSES:

J. R. PEIRCE.
RECORDING APPARATUS.
APPLICATION FILED JULY 2, 1908.

1,110,643.

Patented Sept. 15, 1914.
10 SHEETS—SHEET 3.

WITNESSES:
Fred White
René Bruine

INVENTOR:
John Hoyden Peirce,
By Attorneys,
Arthur C. Rasert Usina

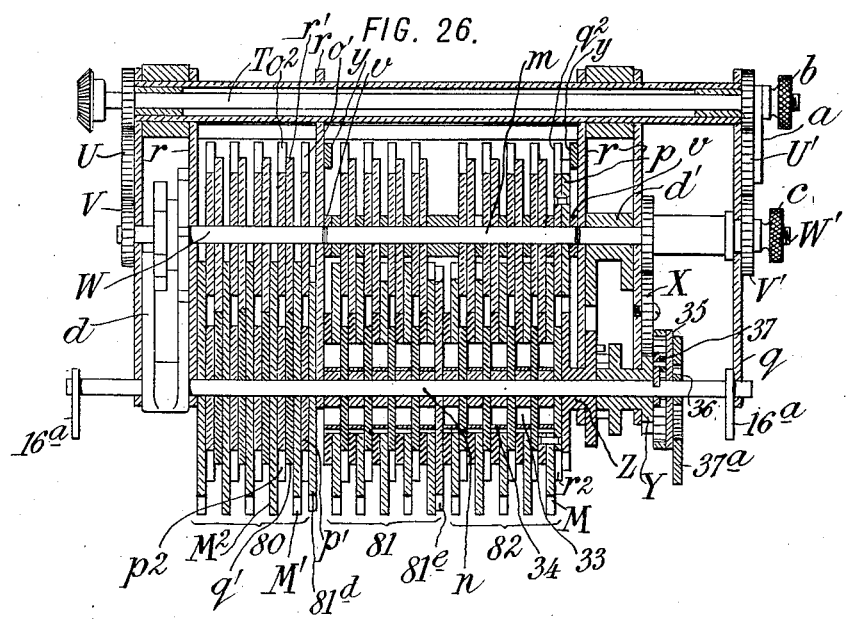
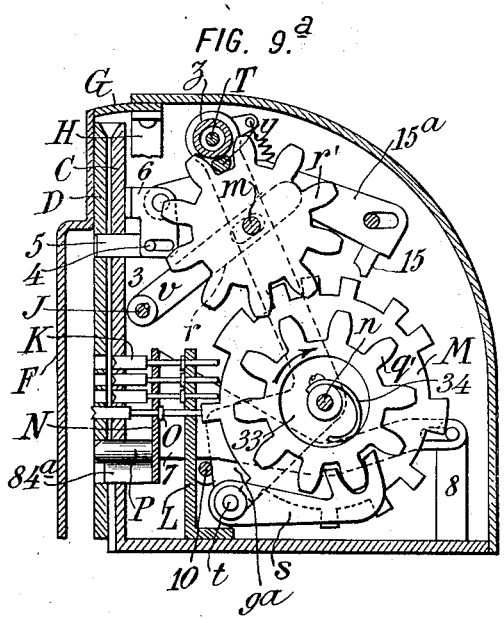

J. R. PEIRCE.
RECORDING APPARATUS.
APPLICATION FILED JULY 2, 1908.

1,110,643.

Patented Sept. 15, 1914.
10 SHEETS—SHEET 5.

WITNESSES:
Fred White
René Quine

INVENTOR:
John Royden Peirce,
By Attorneys,

J. R. PEIRCE.
RECORDING APPARATUS.
APPLICATION FILED JULY 2, 1908.

1,110,643.

Patented Sept. 15, 1914.
10 SHEETS—SHEET 6.

WITNESSES:
Fred White
René Bruine

INVENTOR:
John Hoyden Peirce,
By Attorneys
Arthur C. Rasert Usina

J. R. PEIRCE.
RECORDING APPARATUS.
APPLICATION FILED JULY 2, 1908.
1,110,643.
Patented Sept. 15, 1914.
10 SHEETS—SHEET 7.
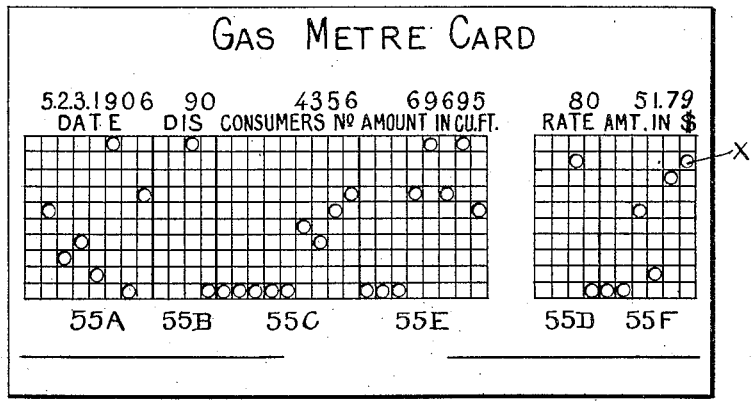
FIG. 20.
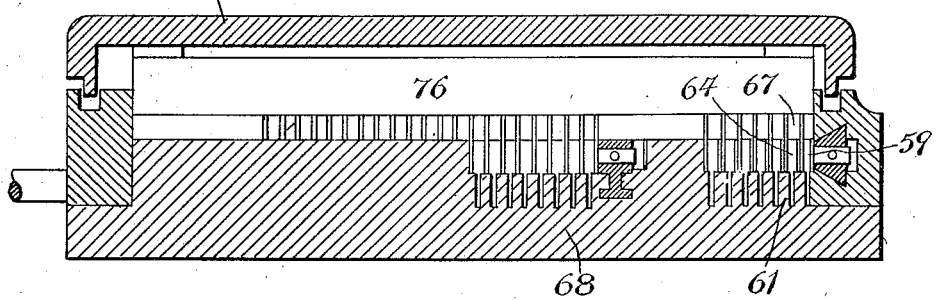
FIG. 23.
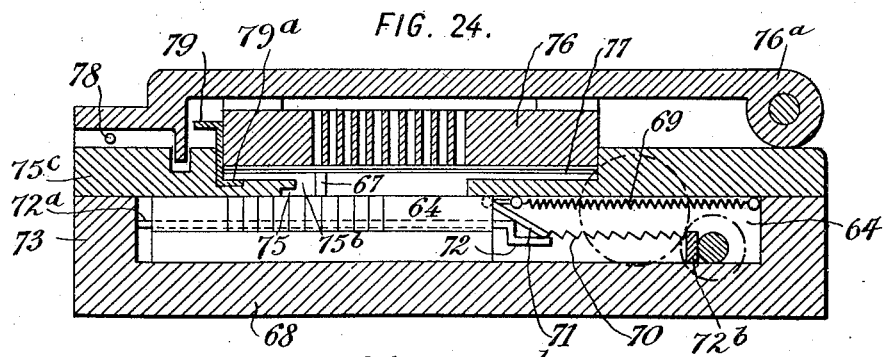
FIG. 24.
FIG. 25.
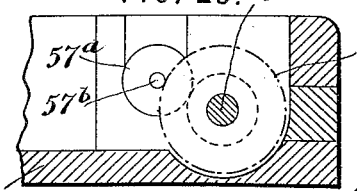
WITNESSES:
Fred White
René Buine
INVENTOR:
John Royden Peirce,
By Attorneys, J. R. PEIRCE.
RECORDING APPARATUS.
APPLICATION FILED JULY 2, 1908.
1,110,643.
Patented Sept. 15, 1914.
10 SHEETS—SHEET 8.
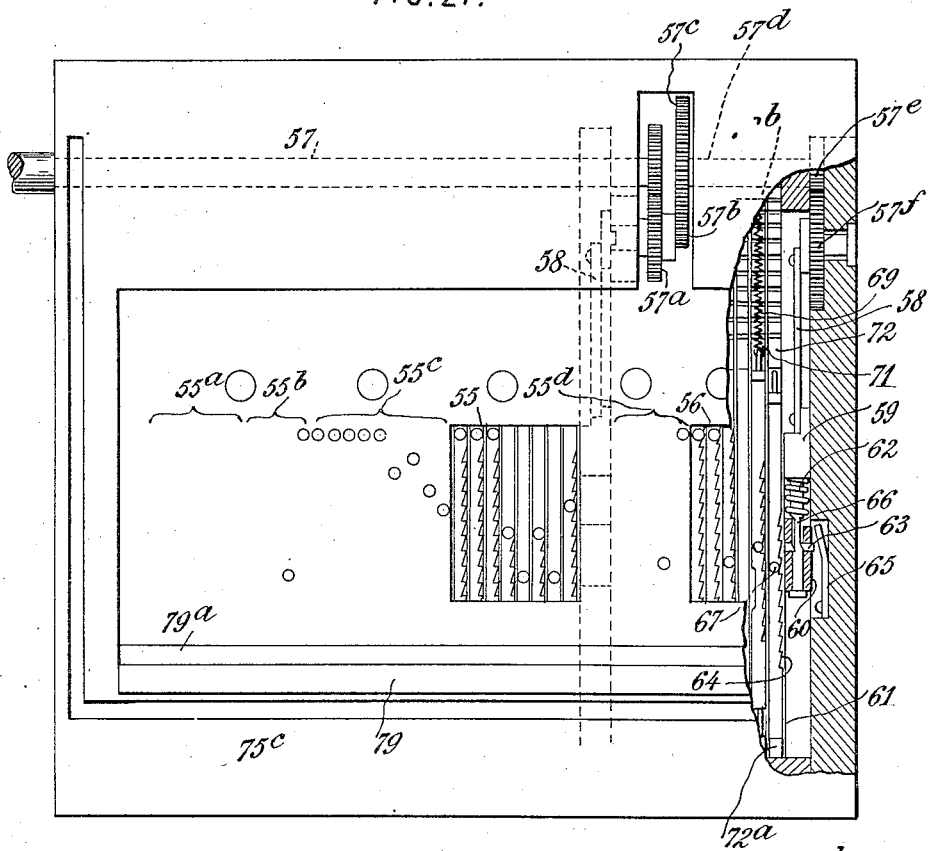
FIG. 21.
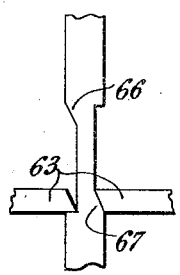
FIG. 22.
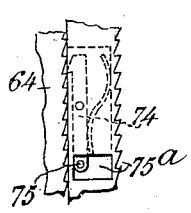
FIG. 21ᵃ
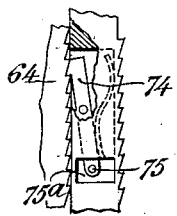
FIG. 21ᵇ
WITNESSES:
INVENTOR:
John Hoyden Peirce,
By Attorneys,

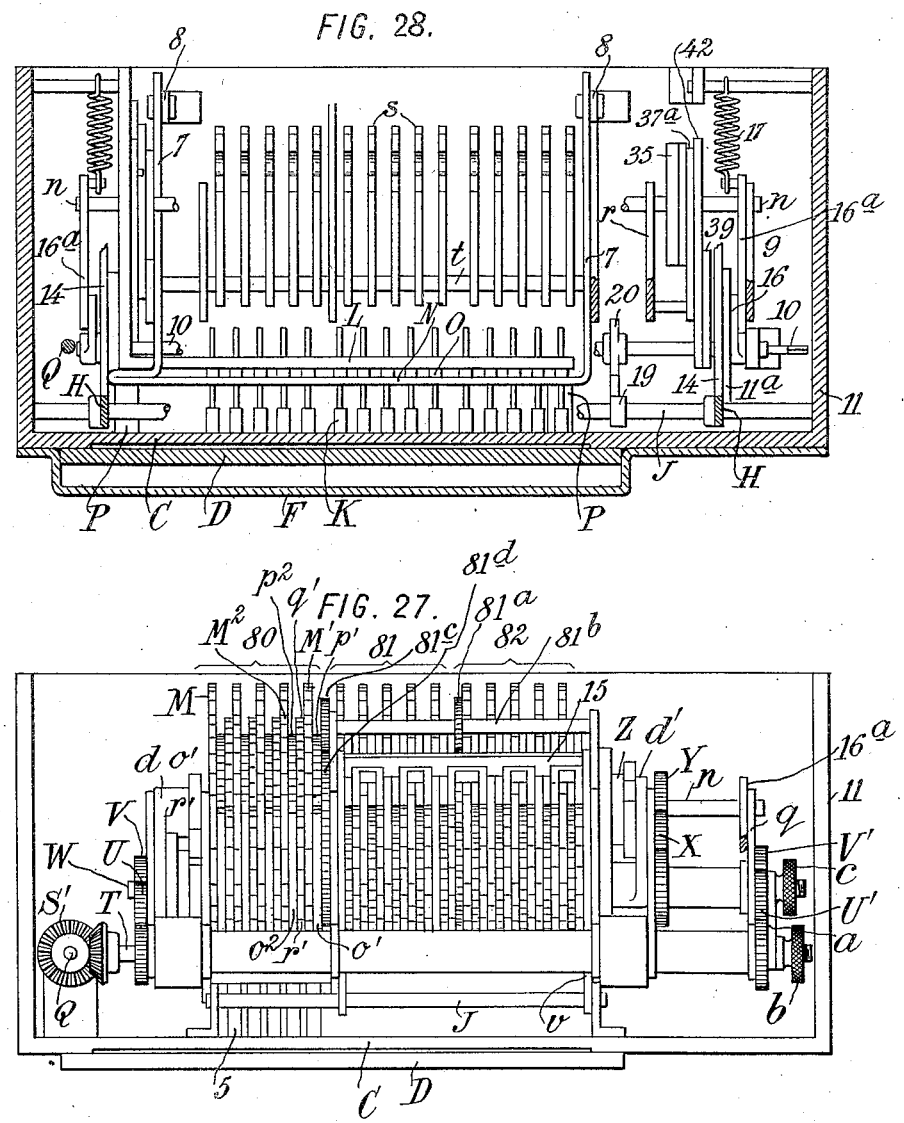

J. R. PEIRCE.
RECORDING APPARATUS.
APPLICATION FILED JULY 2, 1908.

1,110,643.

Patented Sept. 15, 1914.
10 SHEETS—SHEET 10

WITNESSES:

INVENTOR
John Royden Peirce,
By Attorneys,

UNITED STATES PATENT OFFICE.

JOHN ROYDEN PEIRCE, OF NEW YORK, N. Y.

RECORDING APPARATUS.

1,110,643.     Specification of Letters Patent.     Patented Sept. 15, 1914.

Application filed July 2, 1908. Serial No. 441,618.

*To all whom it may concern:*

Be it known that I, JOHN ROYDEN PEIRCE, a citizen of the United States, residing in the borough of Manhattan, city, county, and State of New York, have invented certain new and useful Improvements in Recording Apparatus, of which the following is a specification.

This invention aims to provide improvements in apparatus for recording the advance or position of the registering mechanism of a meter. The record may be made by punching a card, or in place of the punches there may be substituted printing or stamping or similar devices. Any style of meter may be used with this improvement, such, for example, as gas, water, or electricity meters, clocks, arrangements for measuring distances by the rotation of a wheel or shaft, and in fact any mechanism whose progress is to be recorded. The apparatus may also be designed to measure the total progress of a mechanism and its progress during certain intervals, this combination being especially useful with machinery registers.

Preferably the punching or similar recording mechanism is controlled by the position of the meter, and is adapted to be actuated at any time that a record is to be made of such position. Preferably also a fixed number or symbol is punched in the card at the same time to identify the meter from which the record is taken, or to indicate a rate by which the meter reading is to be multiplied, or for similar purposes.

The accompanying drawings illustrate embodiments of the invention.

Figure 2:
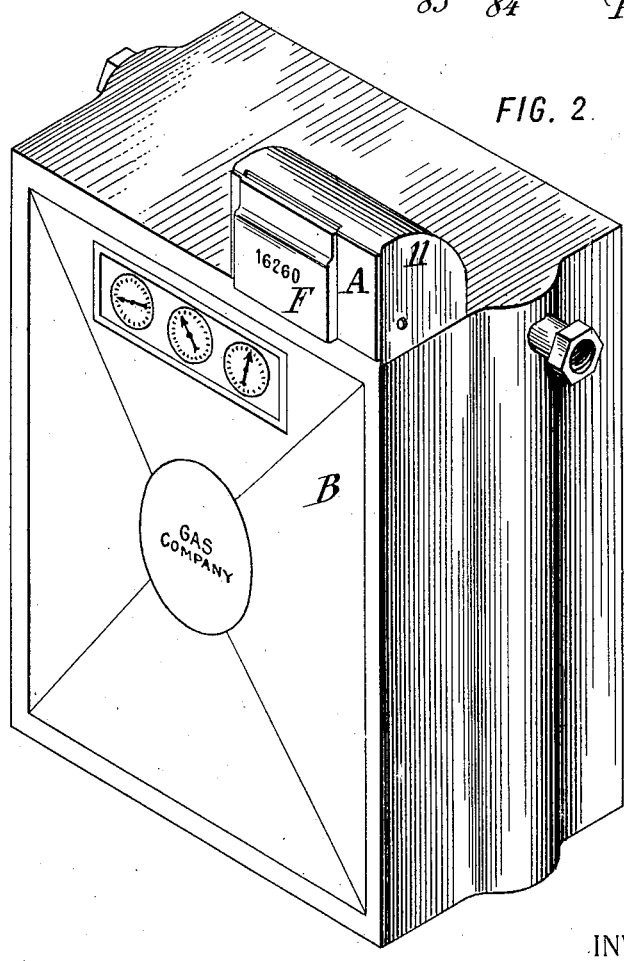
Figure 5:
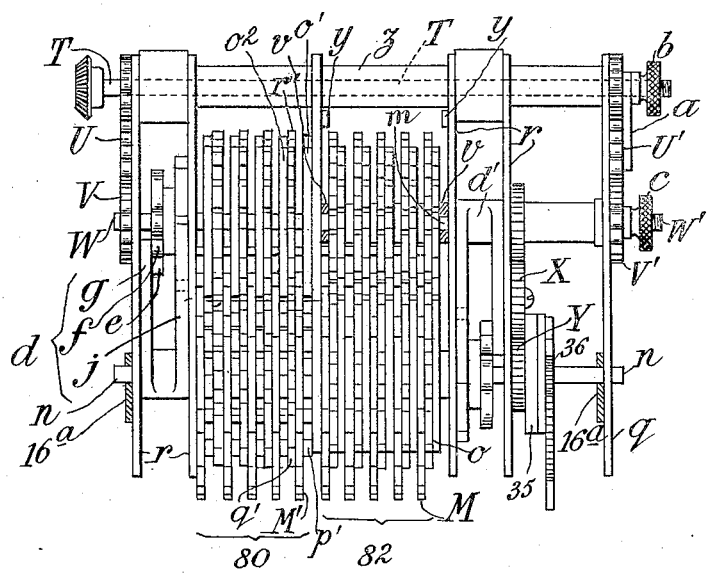
Figure 6:
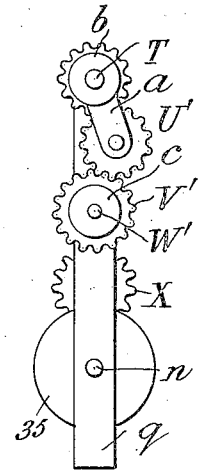
Figure 3:
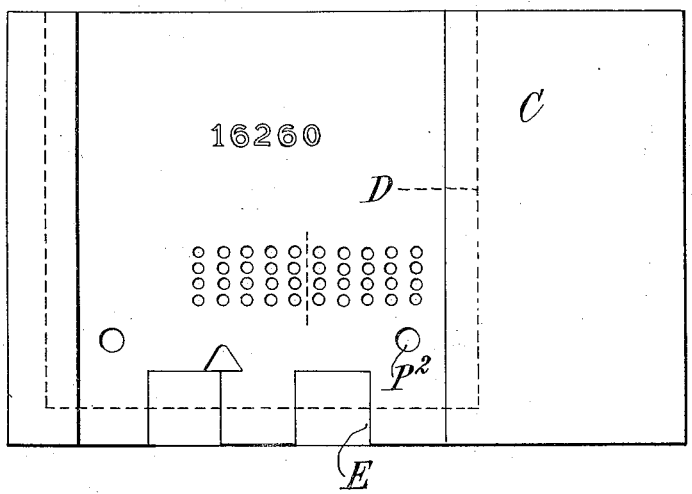
Figure 4:
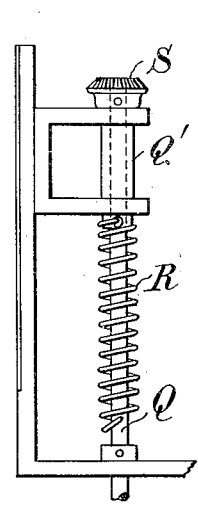
Figure 7:
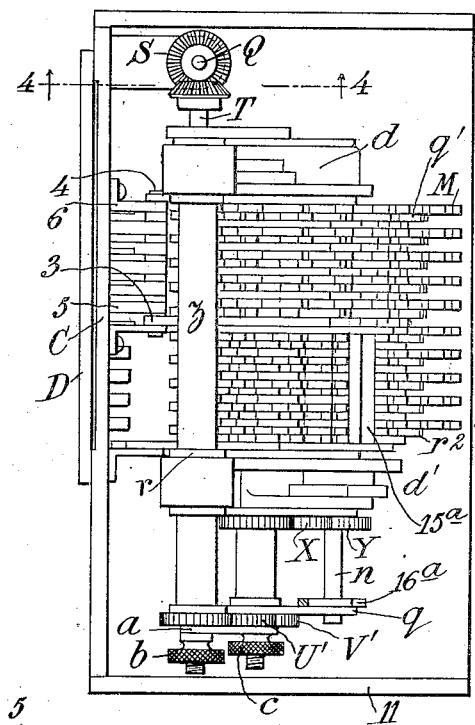
Figure 8:
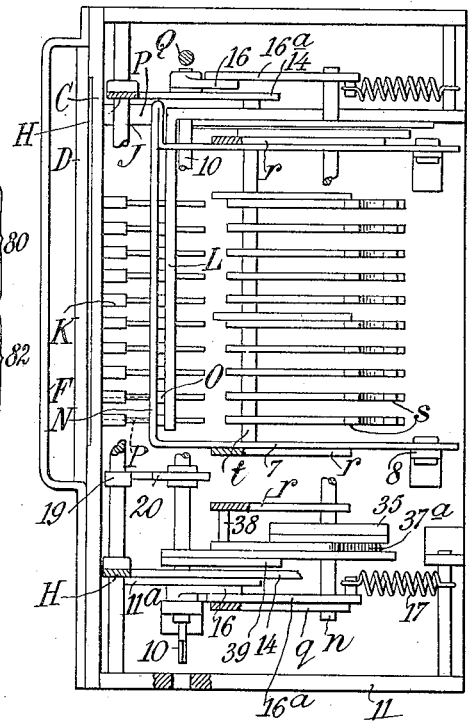
Figure 9:
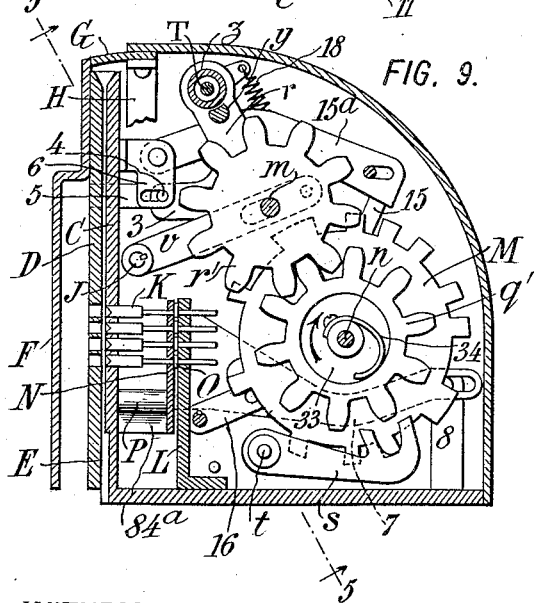
Figure 10:
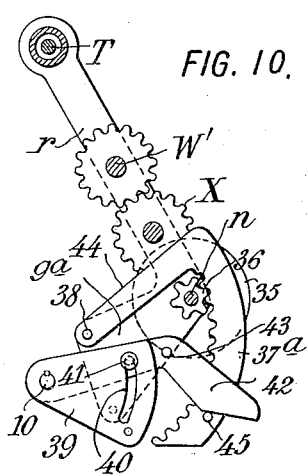
Figure 11:
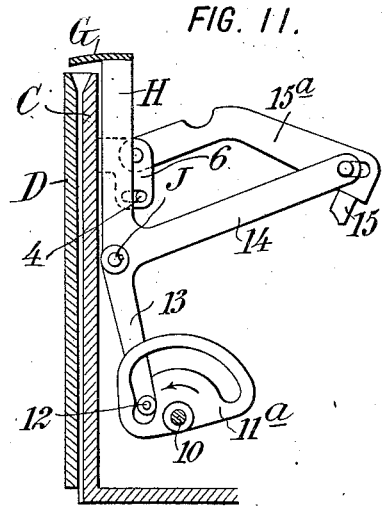
Figure 13:
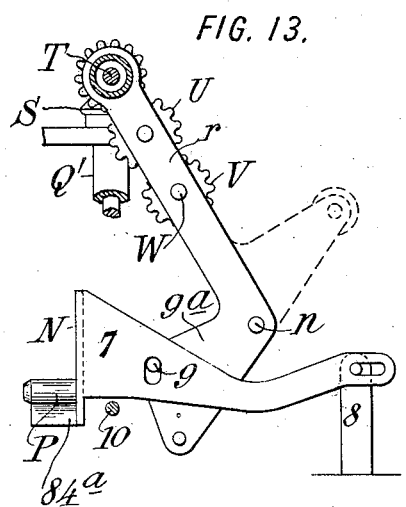
Figure 14:
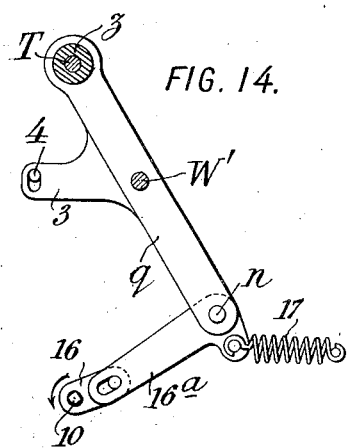
Figure 15:
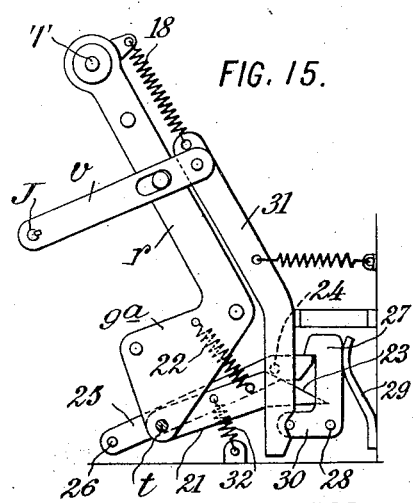
Figure 12:
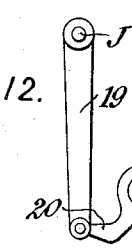
Figure 17:
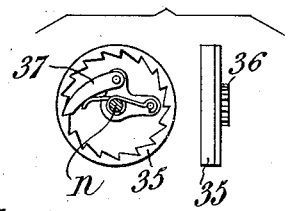
Figure 18:
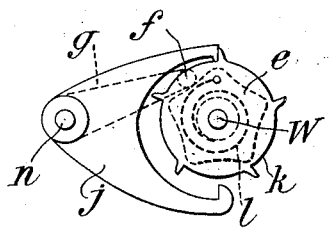
Figure 16:
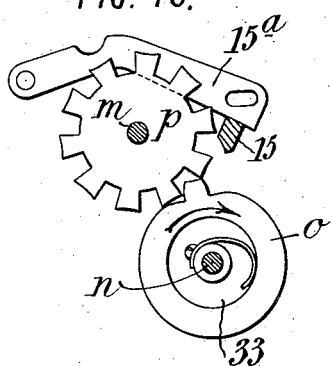
Figure 19:
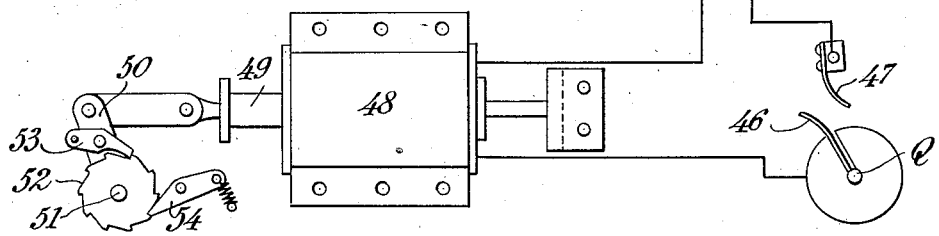
Figure 29:
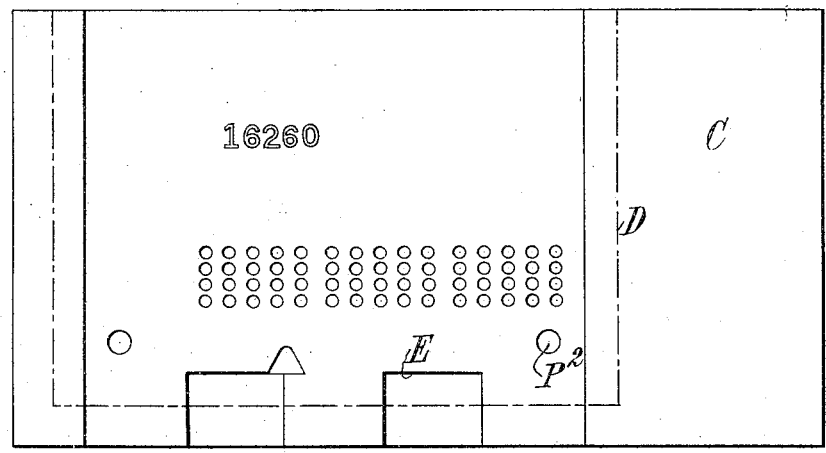
Figure 30:
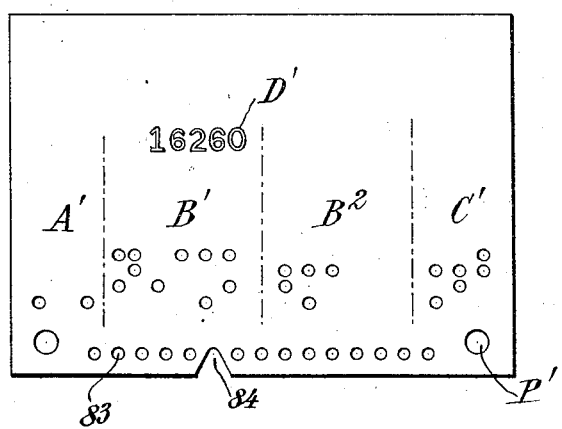

Figure 1 is a card punched to record the position of the meter. Fig. 2 is a perspective view of a gas meter with the improved mechanism applied thereto. Fig. 3 is an elevation of the recording mechanism, with the outer wall of the pocket removed. Fig. 4 is a vertical section through the shaft which transmits the movement of the meter to the recording mechanism, and which is referred to as the meter shaft, the plane of section being indicated approximately at 4—4 of Fig. 7. Fig. 5 is an oblique front elevation of the gearing and connected parts, the plane of section being approximately along the line 5—5 of Fig. 9. Fig. 6 is an elevation of the right-hand side of Fig. 5. Fig. 7 is a plan of the apparatus with the cover removed. Fig. 8 is a plan, omitting the gearing. Fig. 9 is a transverse section showing the principal parts in end elevation. Fig. 9ª is a similar view showing the parts in the position of actuation of the punches. Figs. 10 to 18 inclusive are side elevations of various details,—Fig. 10 showing the mechanism for turning the punch-controlling disks back to zero; Fig. 11 showing the mechanism for opening the pocket and stopping the punch-controlling disks at zero on their backward movement; Fig. 12 showing a lock for holding the two lines of gears in mesh with each other; Fig. 13 the mechanism for withdrawing the punches from the card; Fig. 14 the mechanism for operating the punches carrying the fixed number; Fig. 15 the mechanism for withdrawing the pawl which prevents the rotation of the punch-controlling disks during the punching operation, so as to permit them to be turned back to zero; Fig. 15ª a similar view showing the parts in another position; Fig. 16 the transmission of the tenth step from one decimal place to the next; Fig. 17 the ratchet and pawl for restoring the punch-controlling disks to zero, and Fig. 18 the escapement for converting the movement of the meter shaft to an intermittent movement of the punch-controlling mechanism. Fig. 19 refers to a second embodiment of the invention and is a diagram in elevation of mechanism for utilizing the apparatus in connection with an electricity meter. Figs. 20 to 25 inclusive refer to a third embodiment of the invention. Fig. 20 is a face view of another style of card which is made by the machine of Figs. 21 to 25. Fig. 21 is a side elevation, partly in section, of another type of punching apparatus. Figs. 21ª, 21ᵇ and 22 are details of the same. Fig. 23 is a cross-section of Fig. 21 transverse to the slides carrying the punching pins. Fig. 24 is a section parallel to and between two such slides. Fig. 25 is a sectional view of the gearing of Fig. 21. Figs. 26 to 30 inclusive refer to a fourth embodiment of the invention. Fig. 26 is a sectional view of an apparatus for taking not only differential but also total records of gas. Figs. 27 and 28 are views of the same apparatus similar to Figs. 7 and 8. Figs. 29 and 30 are respectively a front elevation of said apparatus and a face view of a card punched thereby.

The card punched with this apparatus is designed to serve as a controller for reproducing the item represented by the position of the meter in a listing, adding, billing, or other printing or typewriting machine. The card may be any sheet, leaf, or ribbon, of light cardboard or other suitable material.

We will describe the application of the apparatus of Figs. 1 to 18 to a gas meter, and its use in connection with other meters will be understood. It is built in the form of an incased attachment A adapted to be mounted above a vertical shaft in a regular meter B with the shaft extending up into the casing A. The complete apparatus is quite small and inexpensive, and is positive and reliable in operation. It is equipped with two sets of punches or pins or other recording devices. One set registers the number of cubic feet of gas, being operated directly from the meter shaft, while the second set is operated from the meter shaft and through an intermediate gear proportioned to the price of gas, and registers the advance of the meter in dollars and cents. That is to say, with gas at a dollar per thousand cubic feet the rate gear would be designed for a ratio of 10 to 1, so that when ten cubic feet are registered on one set of punches, one cent is registered on the second set. Preferably after taking off a record of the position of the meter, the mechanism which records dollars and cents is shifted back to zero, so that each money reading represents the cost of the gas passing through the meter between the last reading and the present one. This is a point of extreme practical utility.

The casing of the apparatus is normally closed to prevent the introduction of a card, or other tampering with the mechanism, by unauthorized persons, being fastened by a Yale or similar lock of which only the gas company has the key. In order to take a reading, the box is first unlocked and the card placed in it, after which the operator draws the key or handle forward, and the entire record is perforated in the card. The perforations made by the first set of punches correspond with the actual reading of the meter, while those made by the second set of punches correspond with the cost in dollars and cents of the amount of gas consumed between the previous reading and the present one. These punchings are preferably in the second and third columns of the card, the first column being punched to correspond with the date, a separate machine being preferably used for this purpose. There are no actual lines marked on the card, but Fig. 1 shows in dotted lines the limits of the three columns A', B' and C'. In adition to recording the position of the meter, the card is punched or otherwise marked and preferably in the same machine, with a number identifying the meter and also the consumer, such, for example, as the number 16,260, as shown at D' on the card in Fig. 1. This operation may be performed by a small die in the machine, carrying the fixed number.

At the end of a day all the cards taken on that day are punched by a simple dating machine, and are ready for use by the bookkeeper in making up his ledger and other account books. Mechanism adapted to be controlled by the meter card for these purposes is described in other applications for patents which I have filed, and need not be described at length here.

Referring to the embodiments of the invention illustrated in Figs. 1 to 18 inclusive, the apparatus is provided on its front wall with a pocket the inner and outer walls C, D of which are provided with perforations corresponding to the punches, and with perforations for the passage of suitable setting pins. The bottom of the pocket is provided with openings E for the escape of dust or dirt, and substantially the entire pocket is covered by a shield F to protect the ends of the pins from exposure. The top of the pocket, through which the card is inserted, is normally closed by a removable cover G supported upon arms H fixed on a shaft J which is turned to swing the cover G inward by mechanism hereinafter described when the record is to be taken.

Any system of perforating may be adopted. The mechanism of Fig. 3 is adapted to use a system in which the several digits are represented by various combinations of four perforations, the four punches for each digit of the number to be punched being arranged in a vertical line with each other. Five such lines are shown for recording the number of cubic feet of gas, and five for the dollars and cents. It will be appreciated that out of four punches enough different combinations may be effected to represent any desired digit from zero to nine.

The several recording punches K are supported at their forward ends in the rear wall C of the pocket, and at their rear ends in an upright standard L through which they project rearwardly. They are advanced by disks M which swing forward against their rear ends and they are retracted by a plate N engaging collars O on the pins, which plate carries setting pins P and advances at each operation of the machine so as to permit the advance of any selected group of punches, and which is withdrawn rearwardly after each operation so as to rotate all the punches which have been advanced, to their rearward position.

The disks M for operating the punches are provided on their peripheries with projections and recesses in ten groups, the projections and recesses of each group being differently arranged so that when any group is brought in register with a line of four of the punches K, and is then forced forward, it will operate a corresponding group of punches to represent a figure from zero to nine. The meter shaft Q comes up vertically through the top of the meter, as explained, and through the intermediation of a spring R turns (Fig. 4) a sleeve Q' carrying a gear S and drives a horizontal (Figs. 5 and 7) shaft T at substantially the same rate as the meter shaft. From the shaft T (Figs. 13 and 26) by gears U and V there is driven at the same rate the shaft W. At the opposite side of the machine there are similar gears U' and V' and a shaft W' which is rotated at the same rate as the shaft T. By a further gear X there is driven a gear Y at a rate depending upon the ratio between the gears U' and V'. The gear Y is loose on a shaft $n$ running through the centers of the disks M and M'.

U' is an idle gear supported by pivoted arms $a$ (Fig. 6) from the shaft T so as by swinging to one side to permit the use of a gear V' of various sizes, and this gear V' is made removable and changeable according to the price of gas.

For convenience of distinction the shaft W which rotates at the same rate as the meter shaft, is called the principal or synchronous shaft, and the hub of the gear Y which rotates at a different rate is called the secondary or rate-controlled shaft. The thumb-nuts $b$ and $c$ permit of the removal and replacement of gears V' of various sizes. To punch the card shown the principal disks, representing the actual consumption of gas, are arranged at the left in Fig. 5; and the secondary disks, representing the cost, are arranged at the right. The principal disks are controlled by the upper or synchronous shaft W, and the secondary disks by the rate-controlled shaft or hub of the gear Y.

The shaft W and gear Y rotate continuously as long as the meter is running, and in order that the recording mechanism (the disks and pinions of which rotate freely on the shafts) shall snap from one position quickly to the next so as to avoid the taking of records at intermediate positions, their rotation is converted into regular intermittent movements by means of escapements which I designate as a whole by the letters $d$ and $d'$ respectively. Such an escapement may be of a common type, as indicated in Fig. 18, where a pentagonal plate or cam $e$ is mounted on the shaft W and lifts and lowers the laterally projecting end $f$ of an arm $g$ which is loose on a lateral shaft (the shaft $n$ for convenience) and which is fixed to an escapement anchor $j$ having two arms which engage a five-toothed escapement wheel $k$ which is free to rotate on the shaft W and is connected thereto by a spiral spring $l$. As the shaft W rotates it tends to rotate the escapement wheel $k$, but the latter is held by the escapement anchor $j$ until the latter is moved in one or the other direction by the pentagonal cam $e$. The escapement wheel therefore snaps from one position to the next and carries with it the shaft which operates the first or unit wheel of the record-controlling mechanism. The principal or synchronous drive, that of the left-hand group of wheels 80 in Fig. 5, is from the shaft W. The drive of the right-hand group 82 is from the gear Y.

The lower shaft or hub of the gear Y rotates about a smaller shaft $n$ which extends continuously through both groups of disks M and their corresponding pinions. The shaft W extends only through the upper pinions corresponding with the group 80. The upper pinions corresponding with the group 82 are carried upon an entirely independent shaft, which with its pinions may be raised to disengage the pinions carried thereby from the lower set of pinions. The construction will be more clearly understood by reference to Fig. 26, (illustrating another style of apparatus hereinafter described in more detail) which shows the separate shaft $m$ with the gears thereon in section. Of the five disks M in the group, the one at the right, M', corresponds to the units place. Alongside of and fastened thereto is a ten-toothed pinion $p'$. On the shaft W at the right-hand end is a disk $o'$ having a single tooth, the shape of the disks $o'$ and $p'$ being indicated at $o$ and $p$ in Fig. 16. Consequently for each revolution of the shaft W the pinion $p'$ makes one-tenth of a revolution, and the punch-controlling disk M' likewise makes one-tenth of a revolution. The disk or one-toothed pinion $o'$ is keyed upon the shaft W, but the remaining pinions thereon are free. Rotating with the pinion $p'$ and the disk M' is a second pinion $q'$ engaging a pinion $r'$ on the shaft W. This pinion $r'$ carries the second one-toothed pinion or disk $o^2$ corresponding to the tens place, and driving the second ten-toothed pinion, $p^2$, which is attached to the second punch-controlling disk M². Thus the motion is transmitted from the unit point as in the ordinary type of gearing for adding and similar machines, and need not be explained more fully. A similar operation of the group of disks and pinions 82 takes place, except that the drive is from the gear Y (Fig. 5) so as to permit of lifting the shaft $m$ and parts carried thereby. In this case the short hollow shaft constituting the hub of the gear Y carries at the right-hand end of the group a one-toothed pinion $o$ which engages a ten-toothed pinion $p$ which is loose on the shaft $m$ and which is attached to a simple pinion $q^2$ which drives an identical pinion $r^2$ which is rotatable about the shaft $n$ and fastened to the unit disk M of the group. From this unit disk the succeeding disks are driven in a manner similar to that described for the group 80.

The several shafts with the gears and disks thereon are mounted upon a swinging frame consisting of an arm $q$ adjacent to the pinions U' and V' and pairs of arms $r$ adjacent to the escapements and intermediate pinions. The frame carrying the shafts and pinions and disks swings about the main shaft T which is arranged near the top of the machine, the entire mass of gearing being swung forward when the punches are to be operated. Besides this principal action, several other actions are introduced. First the punch-controlling disks M are locked by means of forked arms $s$ (Figs. 9 and 9$^a$) carried on a common shaft $t$ and adapted to be swung up to engage the several pinions $q'$ $r^2$ which carry the disks M. Then arms $v$ (Figs. 9, 9$^a$ and 15) on the shaft J and carrying in slots at their opposite ends the shaft $m$ of the upper line of gears, are swung upwardly to withdraw these gears from engagement with the gears on the lower shaft, and to lock the upper gears at the same time by causing two teeth of such upper gears to straddle fixed projections $y$ from the inner arms $r$. Thereupon the punch-controlling disks, the different sets of gears, and the pawls $s$, are all swung forwardly by rotating the hollow shaft $z$ surrounding the main shaft T and on which are mounted the arms $q$ and $r$ which carry the shafts and gears.

Two of the inner arms $r$ (see Figs. 7 and 9) which swing with the arms $q$ have lateral projections 3 which carry a pin 4 which in turn carries the fixed group of punches 5 for punching the identifying number of the meter; the forward ends of the punches being supported in the inner wall of the pocket, and the free ends being supported by the pin 4 which lies in horizontal slots in brackets 6. Therefore the forward movement described operates also the punches 5.

The setting pins P are preferably tapered on their ends and adapted to enter previously provided perforations P' (Fig. 1) in the card and openings P$^2$ (Fig. 3) in the pocket wall, and to force the card to its correct position in the pocket and hold it there while it is being punched. These pins are supported near the lower edge of the plate N previously referred to. The plate N is provided at its ends with lateral arms 7 see Figs. 8, 9 and 13 supported at their free ends upon fixed standards 8 by a pin-and-slot connection, and connected by pins 9 working in slots in the arms 7 to the forward lateral projections 9$^a$ of the arms $r$ which carry the lower shaft $n$ and move forward and backward therewith. Consequently the plate N and setting pins P are advanced at each operation and retracted with the punch-controlling disks M.

The several operations are all effected by the operation of the key shaft 10 (Figs. 8, 9$^a$ and 10). Any suitable lock is provided in the wall 11 of the casing, through which can pass only the key for which the lock is designed, and the key is arranged to engage the squared end of the shaft 10. For a better leverage to effect the punching operations the key may be provided with a crank handle instead of the ordinary small ring or disk, but the pressure required is not so great as to necessitate this. The first effect of turning the shaft 10 in the unlocking direction, that is, to the left, is to operate the slotted cams 11$^a$ (Fig. 11) whose slots engage pins 12 in the ends of arms 13 loose on the shaft J and connected with the arms H previously described, so as to open the upper edge of the pocket. The same movement of the arms 13 swings down arms 14 connected therewith, and brings a cross-bar 15 (supported between the ends of pivoted arms 15$^a$) down into position to be engaged by zero stops (the teeth on the several disks $o$, Fig. 16) connected with the several punch-actuating disks M, so that in turning these disks back as hereinafter described they shall each be stopped at zero.

As soon as the key is moved far enough to open the pocket, the operator slips a card in and then continues the movement of the key in the same direction. The swinging of the arms 16 (Fig. 14) has no effect through a movement of the shaft sufficient to open the card pocket. Thereafter, however, it pulls the arm $q$ forward against the tendency of the springs 17. This is the forward movement which actuates the punches 5 and K. During the first movement, while the pocket was being opened and the card introduced, the shaft $m$ was first lifted by lifting the arms $v$ (Figs. 15 and 15$^a$), through the turning of the shaft J. A spring 18 (Fig. 15$^a$) tends always to lift these arms, which are keyed on the shaft J, which shaft is provided with a depending arm 19 (Fig. 12) the lower end of which in the ordinary position of the mechanism is engaged and held back by a cam 20 on the key shaft 10, so that the first unlocking movement of the key shaft releases the shaft J and allows the spring 18 to draw the arms $v$ and the gears $r'$ up.

The releasing of the shaft J by the first turn of the key, and the consequent upward pull of the spring 18 (Figs. 15 and 15$^a$), serves also to throw the locking levers $s$ into engagement with the gears $q'$. It is desirable also for reasons hereinafter stated to withdraw the locking levers $s$ at the beginning of the backward movement. This locking of the gears at the beginning of the forward movement, and unlocking of them at the beginning of the rearward movement, is effected by the mechanism shown in detail in Figs. 15 and 15ª. The shaft t on which the several levers s are mounted is carried in the lower lateral projections 9ª of arms r which swing forward and backward with the lower set of gears. On one end of the shaft t is keyed an arm 21 which is connected by a spring 22 to the lower part of the arm r so as to be drawn upward. Upward movement is prevented, however, in the normal position of the mechanism by the engagement of the upper tapered edge 23 of this arm with a pin 24 upon an arm 25 swinging about a fixed pivot pin 26, and whose outer end is held down by a pawl 27 pivoted at 28 and pressed forward by a spring 29.

The pawl 27 has a horizontal arm 30 carrying a pin which rests in a notch in the lower end of a link 31 whose upper end is connected to one of the arms v. Consequently upon the first movement of the key the link 31 is drawn up by the spring 18. It pulls upward the horizontal arm 30 of the pawl 27, and swings the latter back to the position of Fig. 15ª, whereupon the upward tendency of the arm 21 acting on the pin 24 forces the arm 25 upward to a point to prevent the return of the pawl 27, at the same time turning the shaft t and the several locking arms s. Upon the return of the key backward to its starting position the locking arms s must be withdrawn from their gears before the conclusion of the backward movement, so as to permit the return of these gears back to zero. It is in obtaining this action that the tapering edge 23 of the arm 21 is utilized. The upward movement of the arm 21 is limited to a distance sufficient to bring the locking arms into engagement with the gears, and substantially this entire movement is effected as soon as the pawl 27 is withdrawn from over the end of the arm 25. The succeeding backward movement of the arm 21 allows a gradual downward movement of the pin 24 along the inclined edge 23, the arm 25 being under the downward pull of a light spring 32. By the time the end of the forward punching movement has been reached, the arm 25 has moved so far down, and the link 31 has moved so far up, that the pawl 27 springs in again over the end of the arm 25 and holds it against upward movement. Therefore upon the return or backward movement of the arms r carrying the lower set of gears and the shaft t with its arm 21, the oblique edge 23 of this arm engages the pin 24 and causes the arm 21 to be moved downward in position to withdraw the locking arms from the gears, on the next operation.

The several gears q' and disks o are provided with recesses 33 (Figs. 9, 9ª and 16) in which travel springs 34 mounted on collars fixed on the shaft n and bent in such a way that when the shaft is turned to the left the tendency is to increase the bend of the spring and to weaken its frictional grip upon the gear, but when turned to the right the tendency is to straighten out the spring and to increase its grip on the gear. The normal movements of the gears and punch-actuating disks to the right is effected by the described connections with the meter shaft, and the springs 34 yield to such movement. The springs 34 prevent any backward movement by any means whatever, so that no tampering with the meter can reduce a reading once impressed upon the punch-actuating disks. The turning of the disks back to zero is effected by rotation in the same direction,—that is to say, to the right, but this rotation is communicated through the shaft n. The mechanism for effecting the movement is shown most clearly in Figs. 10 and 17. Referring first to the latter figure, the shaft n carries on its end a casing 35 with internal ratchet teeth, the casing being rotatable on the shaft and carrying on its outer face a pinion 36 by means of which it may be rotated. Fixed on the end of the shaft is a pawl 37 pressed into engagement with the internal ratchet, so that as the latter turns to the left there is no communication of motion to the shaft, but as the casing is turned to the right the shaft is moved in the same direction. This motion of the shaft n through the springs 34 forces the pinions q' and the punch-operating segments around to the right with a strong frictional force, so that they move until they are stopped by the positive stop 15. The rotation of the pinion 36 is effected by means of a curved rack 37ª pivoted at 38 on the lower part 9ª of one of the arms r. The key shaft 10 has fixed thereon an arm or plate 39 having a slot 40 engaging a pin 41 upon a second arm 42 carried loosely on the shaft 10, and which arm has a pin 43 projecting from the side opposite the pin 41 and in the plane of the radial arm 44 of the segment 37ª. The segment 37ª has near its lower end a pin 45 lying in the plane of movement of the arm 42. Therefore as the arm 42 is moved upward it strikes the arm 44 and moves the rack and turns the pinion in the ineffective direction,—that is to say, to the left. This movement has no effect upon the punch-actuating disks. Upon the return movement of the key, turning to the right, the distance corresponding to the slot 40 and to the play of the arm 42 in swinging down from the position of engagement with the arm 44 to that of engagement with the pin 45, represents sufficient lost motion to permit of the withdrawal of the locking arms s from the gears, after which a movement of the shaft to the right is effected, with a corresponding movement of the gears around to their zero point, where they are stopped, and any further movement of the shaft $n$ is ineffective.

The operation of the several details being clear it is only necessary to state briefly the operation of the above-described form of the apparatus as a whole.

The operator first inserts his key until it engages with the shaft 10. He then turns this shaft slightly until the pocket is uncovered by the inward movement of the cover G, whereupon he inserts a card having therein the setting holes P' (Fig. 1) and the class perforations 83 and 84. He then gives the key a further turn forward, which causes the punching of the holes B', C' and D' in the card, after which the key is turned partly back, the card withdrawn, and the key turned fully back to its starting position and withdrawn. The first part of the forward movement of the key not only uncovers the pocket, but also turns the cam 20 (Fig. 12) so as to release the shaft J and allow the spring 18 (Figs. 15 15$^a$) to release the holding mechanism so as to permit an upward movement of the locks $s$ which holds the printing disks M M' in the position to which they have been rotated by the meter shaft. The second part of the forward movement of the key throws down the zero stop 15 and advances the punching disks M M' and the punches K to punch the holes B' and C' respectively in the card, and also advances the fixed punches 5 to punch the identifying number D' in the card. This forward movement also turns the shaft $m$ to the left without effect upon the disks carried thereby, and lifts the shaft $m$ carrying the gears $p$ through which the rotation of the right hand group of punching disks M is effected, so that these punching disks may be turned to zero later.

On the rearward movement of the key there is first a withdrawal of the locks $s$ through the mechanism of Figs. 15, 15$^a$ and the swinging of the arms $r$ carrying all the disks away from the punching position, and a right handed movement of the shaft $m$ to carry the punching disks around to the zero position, where the teeth of the one-toothed pinions $o$ come up against the zero stops 15. Toward the end the shaft $m$ carrying the upper set of gears corresponding to the punching disks M, is dropped to bring the several gears into engagement, after which the zero stop is lifted. The punches are withdrawn from the card, so that the latter can be removed. Thereafter the key is given its final backward turn, the shaft J is locked by the cam 20 (Fig. 12) and the arms 14 by the cams 11$^a$, and the key withdrawn. The further movement of the meter shaft advances the money disks M from zero and advances the disks M', which refer to cubic feet of gas, continuously from the point of the last reading.

Instead of the mechanism described for transmitting the movement of the meter shaft to the apparatus, a simple electric transmission as in Fig. 19 may be used, this design being adapted for any style of meter, but being especially convenient in connection with electric meters. The meter shaft Q at each revolution wipes a terminal 46 over a fixed terminal 47 so as to complete the circuit through a solenoid 48 and draw in its core 49 carrying an arm 50 pivoted upon the shaft 51 of a ratchet wheel 52, the arm 50 carrying a pawl 53 and the backward movement of the ratchet being prevented by a pawl 54; so that each revolution of the meter shaft advances the shaft 51 one step. The shaft 51 may be directly connected to the unit gear and disk of the recording mechanism.

The card and apparatus shown in Figs. 20 to 25 inclusive involve certain differences, especially in the use of the card.

The amount of gas consumed is the total amount registered by the meter (supposing that the card is taken directly off the meter-controlled mechanism hereinafter described), and the amount of money on the card is the cost of the total amount of gas. In determining the amount of the customer's monthly bill, the amount of gas and of money indicated by the previous card will be subtracted from the amount indicated by the latest card. This will be done by means of a billing or subtracting machine, which will print the difference when the two cards are put into the machine and the lever operated.

The face plate of the machine is provided with punches representing the distribution number, the consumer's number, and the rate, all of which are fixed for any particular machine; and suitably located relatively to these fixed punches are series of movable punches representing the condition of the meter in units of volume and in monetary units. The units of volume for example may be indicated at 55 and the monetary units at 56. The spaces for fixed punches are indicated at 55$^a$, 55$^b$, 55$^c$, 55$^d$, corresponding to "Date", "Distribution", "Customer's No.", and "Rate" respectively,—dating punches only being omitted, the dating being preferably done with another machine. The corresponding spaces on the card are marked 55$^A$, 55$^B$, 55$^C$ and 55$^D$; the spaces for the amounts in feet and in money respectively being marked on the card, 55$^E$ and 55$^F$. The movable punches shown at 55 and 56 are driven from the shaft 57 of the meter through suitable gearing causing the reciprocation of a link 58 and slide 59, the latter operating the punch of the unit column, which in turn operates the punch of the tens column, which in turn operates that of the hundreds column, and so on. The shaft 57 drives directly a pinion 57ª which actuates the link 58 and slides for measuring cubic feet of gas. The second link 58 is driven through intermediate gearing proportioned to the price of gas and comprising a pinion 57ᵇ driven by the pinion 57ª, a gear 57ᶜ, shaft 57ᵈ and pinions 57ᵉ and 57ᶠ.

The pins must advance from one digit to the next suddenly in order to avoid their being between two spaces when a card is introduced and perforating the card accordingly. This effect is obtained through an intermediate sleeve 60 which is pressed down on the lower portion of the slide 59 by means of a strong spring 62, this sleeve carrying a pawl 63 extending transversely through the sleeve and adapted to project out therefrom either at the left to engage ratchet teeth on the slide 64 carrying the unit pin, or to project outward at the right as shown in the figure in the drawing, so that when the slide 59 lifts it, it clicks over and is held up by the end of a leaf-spring 65. The movement of the double pawl 63 to the left is effected by an oblique edge 66 (Fig. 22) on the portion of the slide 59, which passes through the sleeve 60; and its movement to the right is effected by a similar shoulder 67 as the slide rises. Supposing the slide to be in its lowest position and also the sleeve 60, then as the slide rises the inclined edge 66 throws the pawl 63 outward at the right. The continued rising of the slide lifts the sleeve 60 until the pawl 63 catches over the end of the spring 65. Then the slide 59 commences to descend, but this descent has no effect until the inclined edge 66 engages the left-hand portion of the pawl 63 and throws the latter out to the left. As soon as it is thrown out to the left, it is in position to engage the adjacent teeth of the slide 64, and the continuance of the lateral movement of the pawl withdraws it from the support 65. While the sleeve 60 was held up and the slide 59 was descending, the spring 62 was compressed, so that when the support of the sleeve is withdrawn it moves down suddenly to substantially the lowest point in its movement, carrying the slide 64 a distance of one digit. When the sleeve 60 has traveled a little over the distance of one digit, the pawl 62 strikes the incline 66 and is quickly forced to the right again. The punch slide 64 has a ratchet which is clicked over one tooth of a holding pawl in the downward movement described, and is drawn back by a spring which pulls it upward, so that its movement is accurately limited. The punch slide 64 carries a punch about the middle point of its outer edge. The several slides travel in suitable grooves 61 in a plate 68 and are drawn toward the zero position by springs 69 (Fig. 24). Each slide is checked however in its backward movement by a ratchet 70 fixed in position upon the plate 68, and adapted to be engaged by a pawl 71 pivotally attached to the slide at its upper end. At the end of each downward stroke the pawl 71 is lifted away from the ratchet by means of a rod 72 which runs longitudinally through the center of the slide 64 and projects beyond it at both ends. Thus when the slide moves to its lowest position the lower end of 72ª of the rod 72 strikes against the end piece 73 and is pressed upward sufficiently to free the pawl 71; and the rod 72 retains this position until the spring 69 has raised the slide again to its uppermost position, causing the rod 72 to strike a fixed cross bar 72ᵇ to be pushed back again to a position which allows the pawl to come into action against the ratchet 70.

As each bar moves from 9 to zero, it must carry the bar of the next decimal place forward one space. To accomplish this a recess is sunk in the left hand edge of each bar and a ratchet cut in its right hand sliding edge. In the recess is fastened a small pawl 74 Figs. 21ª and 21ᵇ which in its normal position is flush with the side face of the bar, being held so by a small spring at its back. It is provided, however, with a pin 75 projecting above the upper edge and adapted to move laterally in a suitable slot 75ª. As the slide carrying this pawl and pin advances from 8 to 9, the small pin traverses a slot 75ᵇ in the underface of the top plate 75ᶜ of the casing. This slot being beveled so as to throw the pin and with it the pawl to the left, brings the pawl slide into engagement with one of the teeth of the ratchet of the next punch slide. On the next step, as the slide carrying the pawl advances beyond 9, it carries the next higher slide one space, and then itself returns to zero in the manner previously described.

Over the pins is hinged cover 76ª on the inner face of which is fastened a block 76 of the same size as the card 77 and exactly fitting in the card recess formed in the top plate 75ᶜ of the frame. It is provided with perforations corresponding to all positions of the pins. The cover of the box is opened, the card is placed face down in the recess, the strip or block 78 is removed, and the cover tightly closed. The cover carries down the block 76, which perforates the card. The cover is now opened which removes the block 36 and the card is removed, lifting its edge by means of a small Z-shaped strip 79, 79ª resting under an edge of the card in a suitable groove in the plate 75ᶜ. Before closing the cover again the strip 78 is replaced in order to prevent the plate 76 from being lowered sufficiently to interfere with the movement of the pins.

A simple modification to adapt the apparatus of Fig. 2 for the recording of a differential reading of the meter as well as a total reading, and as well as a differential reading of the cost, will be understood from Figs. 26 to 30 inclusive. The group of disks indicated at 80 are operated to register the total number of cubic feet, corresponding with the ordinary reading of the meter. The group indicated at 81 represents the differential reading of the meter, that is to say, the number of cubic feet which the meter has advanced since the last previous record was made. The unit wheel of this group is driven from a pinion 81$^a$ (Fig. 27) carried on a shaft 81$^b$ suspended outside of the disks and having a pinion 81$^c$ at one end driven by a gear 81$^d$ attached to the unit disk M' of the group 80. The gear 81$^e$ by which the rotation of the pinion 81$^a$ is transmitted to the unit disk of the group 81 is identical with the gear 81$^d$, so that these two groups rotate at the same speed. But the group 81 is returned to zero with the group 82 after each operation. The group marked 82 corresponds with the cost of the gas passing through the meter since the last previous record. It is only necessary to provide that the groups 81 and 82 shall be turned back to the zero position after the making of each record. Except for the provision of the additional group of disks 81 and the corresponding punches and accessories, this apparatus is similar to that shown in Figs. 1 to 18. The transmission of the rotary movement from the main shaft T to the punch-controlling disks is shown perhaps more clearly in the sectional view, Fig. 26, than in the previous views.

The cards shown in Figs. 1 and 30 have also special provisions for classification and for easily separating all the cards of one class from those of another. The cards are provided along one edge, the lower edge in the present case, with a number of perforations 83 corresponding with the several classes into which the cards are to be divided. Each meter has besides the punches previously referred to a punch 84$^a$ moving forward with the setting punches and cutting in the lower edge of the card a flaring notch 84. For one class of consumers or cards the notches 84 will be located at one position, and for another class at another position. The notches 84 will always register with one or another of the perforations 83. When the cards are placed in a box or drawer of the usual card-index style, they will be placed with their bottom edges upward. They may be arranged indiscriminately in the box, and yet by means of the perforations 83 and notches 84 it will be possible to quickly separate from the others at a single movement all the cards belonging to any one desired class. To do this it is only necessary to introduce a wire through the line of perforations corresponding with the class in question (as for example the perforations which are sixth from the left-hand end where the cards of the class shown in Fig. 30 are to be separated). Then by lifting this wire all cards other than those which are to be separated will be removed from the box by reason of the engagement of the wire with the complete perforations 83; and all cards of the class desired will remain in the box by reason of the fact that the wire will lift freely out of the notch 84 of each card of this class. The principle might be reversed by cutting away all perforations except one, which one would be in a position corresponding to the class desired. Then the insertion of a wire as before described, and the lifting of it out of the box would result in the removal of all cards of the class desired and the retention in the box of all other cards. Or the principle might be extended to provide for two or more notches 84 or two or more closed perforations for any one card which it is desired to include in two or more classes.

What I claim is:—

1. The combination with a meter the reading of which increases continuously, of punching mechanism adapted at each operation to indicate the difference between the present reading and the last previous reading of the meter and means for automatically returning said mechanism to its zero position after each operation.

2. The combination with a meter the reading of which increases continuously, of punching mechanism which is automatically set up in correspondence to the meter reading and adapted at each operation to indicate the difference between the present reading and the last previous reading of the meter and to be automatically returned to its zero position.

3. An apparatus for indicating the increase in reading of a meter, including meter mechanism, a set of laterally immovable punches and laterally movable operating mechanism therefor which is automatically set up in correspondence to the meter reading and adapted to operate said punches to indicate at each operation the increase in reading of the meter since the previous operation.

4. In a machine of the class described, punching mechanism including a set of punches fixed against lateral movement and movable operating mechanism therefor adapted to be controlled by the position of a meter, and a lock normally preventing the operation of said actuating mechanism and adapted to be unlocked only by a special key.

5. In a machine of the class described, punching mechanism including a set of punches fixed against lateral movement and movable operating mechanism therefor adapted to be controlled by the position of a meter, a lock normally preventing the operation of said actuating mechanism, and means adapted for engagement by a key and for operating said punch-operating mechanism by the turning of such key.

6. In a machine of the class described, punching mechanism including a set of punches fixed against lateral movement and movable operating mechanism therefor adapted to be controlled by the position of a meter, and means adapted for engagement by a key and for operating said punch-operating mechanism by the turning of such key.

7. In a machine of the class described, a continuously operating automatic registering mechanism, means for recording the advance of said mechanism since the last previous record and means controlled by said recording means for turning said recording mechanism back to zero after making each record.

8. In a machine of the class described, a recording mechanism including a disk adapted to be rotated as the position of the meter advances, a shaft $n$ on which said disk turns, and a spring 34 for transmitting frictionally the movement of said shaft to said disk in one direction only.

9. In a machine of the class described, a recording mechanism including a disk adapted to be rotated as the position of the meter advances, a shaft in one direction only $n$ on which said disk turns, a spring 34 adapted to transmit frictionally to said disk the rotation of said shaft, and a positive stop for preventing rotation of said shaft past its starting point under the influence of said shaft and spring.

10. In a machine of the class described, a recording mechanism including a disk adapted to be rotated as the position of the meter advances, a pocket having a closure G, an arm H connected with said closure, an arm 14 carrying a zero stop 15, and an arm 13, said arms H, 13 and 14 being connected together, and means for swinging said arm 13 to open said closure and to bring said stop 15 to operative position to stop the rotation of said disk beyond its starting point.

11. In a machine of the class described, a punch-controlling disk, a gear $u$ rotating therewith, a locking arm 5, means for bringing said locking arm into engagement with said gear, and means for actuating said disk to effect a punching operation while said gear is locked.

12. In a machine of the class described, a punch-controlling disk, a gear $u$ rotating therewith, a locking arm 5, a member $q$ carrying said disk, a shaft $t$ for said locking arm 5 and carried also on said member $q$, a pivoted arm 25, an arm 21 on said shaft $t$ normally engaged and held down by said arm 25 to prevent engagement of said locking arm with said gear, means for first releasing said arm 25 and permitting a locking movement of said shaft $t$ and locking arm $s$, then advancing the member $q$ with said disk and locking arm, means for returning the arm 25 to its normal position and locking it there, said arm 21 being adapted to be engaged by said arm 25 on the first return movement of the member $q$, and forced in a direction to withdraw the locking arm $s$.

13. In a machine of the class described, a set of punches, and means for advancing said punches selectively, including a circular member having arranged about its periphery differently grouped projections and recesses, and means for rotating said member to bring such groups in succession in register with said punches.

14. In a machine of the class described, a series of sets of punches, and means for advancing the punches of each set selectively, including a circular member for each set adapted as it is rotated to come successively into position to actuate the punches of its set corresponding to the numerals from zero to nine, means for rotating the first or unit one of said members, and means for communicating every tenth step of one member to the member corresponding to the next higher decimal place.

15. In a punching machine of the class described, punching mechanism, two sets of gears each having a unit wheel, one of said unit wheels being driven at a determined rate relatively to the other, each set containing also one or more wheels representing the higher decimal places, means for transmitting every tenth movement of one of said wheels to the wheel of the next higher decimal place, the two sets of gears being mounted on a common shaft, said shaft being supported upon pivoted arms, and means for swinging said arms to advance the shaft in effecting a punching operation.

16. An apparatus for indicating an amount corresponding to the difference between two successive readings of a meter, including a set of punches fixed against lateral movement and movable operating mechanism therefor controlled by the position of the meter mechanism, and supplementary punching mechanism standing at a determined position representing a rate according to which the meter reading is to be modified.

17. An apparatus for indicating the difference between two successive readings of a meter, including punching mechanism controlled by the position of the meter mechanism, a pocket for receiving a card, and a cover for said pocket the opening and closing movement of which effects a punching operation.

18. The combination with a meter, of means controlled by said meter for separately moving a number of punches into various positions relatively to each other to punch a card so as to indicate according to a determined system the condition of the meter.

19. The combination with a meter, of means controlled by said meter for setting simultaneously in position according to a determined system two series of punches, one indicating the condition of the meter in quantitative units, and the other indicating the price corresponding to the quantity.

20. In a machine of the class described, a plurality of recording mechanisms, means for multiplying the rate of advance of a first one by a desired factor to determine the rate of advance of a second, means for causing a recording operation and means controlled by said recording means for shifting the second separately to zero automatically after a recording operation.

21. In a machine of the class described, in combination, three sets of recording mechanisms, the first of which advances continually, the second of which advances at the same rate as the first and is automatically shifted to zero after a recording operation, and the third of which advances at a rate having a determined relation to the rate of advance of the first shaft and which is also automatically turned to zero after a recording operation.

In witness whereof, I have hereunto signed my name in the presence of two subscribing witnesses.

JOHN ROYDEN PEIRCE.

Witnesses:
 DOMINGO A. USMA,
 THEODORE T. SNELL.